April 23, 1968 G. K. RIEL 3,379,886
SINGLE RADIATION DETECTOR CAPABLE OF SIMULTANEOUSLY
MEASURING SEVERAL VARIABLE CONDITIONS
Filed Nov. 30, 1964 2 Sheets-Sheet 1

INVENTOR
Gordon K. Riel

BY

ATTORNEY

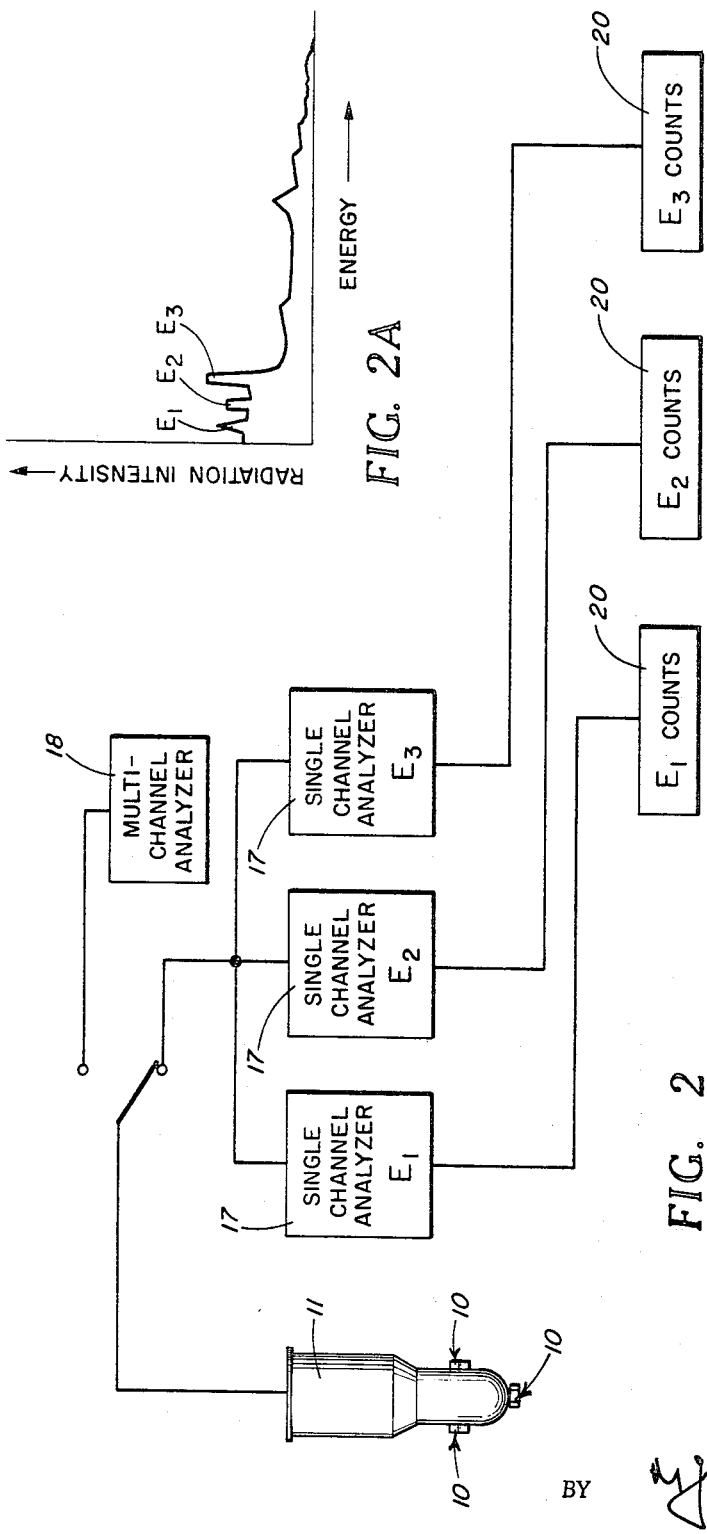

United States Patent Office 3,379,886
Patented Apr. 23, 1968

3,379,886
SINGLE RADIATION DETECTOR CAPABLE OF SIMULTANEOUSLY MEASURING SEVERAL VARIABLE CONDITIONS
Gordon K. Riel, Silver Spring, Md., assignor to the United States of America as represented by the Secretary of the Navy
Filed Nov. 30, 1964, Ser. No. 414,925
8 Claims. (Cl. 250—106)

ABSTRACT OF THE DISCLOSURE

A system wherein a plurality of sources having different energy levels are mounted on their respective sensors. All of the sensors are monitored by a single radiation detector whose function is to detect the variations of intensity of the radiation received from individual sources as the counting efficiency changes in accordance with changes in temperature, pressure, density or other variables. Single channel analyzers and/or multi-channel analyzers can be used to monitor the variations that occur in the different energy ranges.

---

The invention described herein may be manufactured and used by or for the Government of the United States of America for governmental purposes without the payment of any royalties thereon or therefor.

The invention described herein relates generally to systems for measuring pressure, temperature, acceleration, density, position, and other like variables and more specifically to a system which is adapted to measure these variable conditions simultaneously by utilizing existing spectrometer or other similar radiation detection equipment.

In the past it has been customary to employ separate instruments to measure each of the above-mentioned variables and none of these instruments normally employed a radiation detector in making the above measurements. Various other types of sampling instruments have been used for measuring these variables but many of these do not provide a continuous reading of a single variable or of all of these variables at a single location.

The present invention is adapted to employ an existing radiation probe to measure the above-mentioned variables without interfering with the probe's normal function of measuring the natural radiation background at a particular location. The invention is not limited to a particular radiation detector and existing detection equipment can be used without the addition of extra cables for measuring additional properties of the environment of the detector.

One type of spectrometer in the prior art measures underwater gamma radiation in energy levels from 250 kev. to 60 mev. The information is normally collected digitally in channels from 5 to 40 kev. wide. For this particular type of spectrometer the channels below 250 kev. are available for the measurement of the above-described information if this information can be presented as low energy gamma radiation between 0 and 250 kev. at the spectrometer input.

Briefly described, the present invention relates to a system wherein a plurality of condition responsive sensors, each having a source of radiation associated therewith, are mounted adjacent a single radiation detector or probe. The radiation detector converts distinct energy level radiation intensities at the respective sensors to an electrical signal which may be analyzed in such a manner that the variations in radiation intensity at the various sensors can be determined. By calibrating these intensities against the variable condition that each sensor is designed to measure, the variations in pressure, temperature, density and other like variables can be monitored at any given location.

Accordingly, an object of the invention is to provide a system for measuring a number of variable conditions at a single location utilizing existing spectrometer or other radiation detection equipment.

Another object is to provide a system of the type described which does not require extra cables to transmit the extra data processed by the detection equipment.

Another object is to provide a system of the type described which will continuously measure a plurality of variable conditions.

Other and further objects of the invention will become more fully apparent in the following description thereof.

Figure 1:
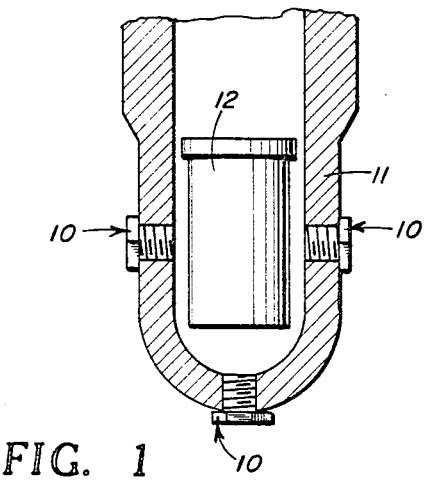
FIG. 1 is an elevation view, partly in section, of a pressure vessel surrounding a radiation detector and having a plurality of condition responsive sensors mounted in the walls thereof.

FIG. 2 is a block diagram representation of the various channel analyzers and measuring equipment for processing electrical signals representative of variations in the various conditions to be measured at the respective sensors located in the pressure vessel; and FIG. 2A is a graphical illustration representing the distribution of gamma ray intensities at various radiation energies, among which include the energies of the radiation sources employed in the individual sensors of FIG. 1.

Referring to FIGS. 1 and 2, the various condition responsive sensors 10 are shown mounted in threaded bores in the walls of an underwater pressure vessel 11 which houses a radiation detector 12. The sensors 10 each have a radiation source 13 (see FIGS. 1A–1E) associated therewith, and each source 13 emits radiation of a predetermined energy level thereby occupying one of several available energy channels between 0 and 250 kev.

An examination of the various sensors in FIGS. 1A through 1E will indicate that the variation in intensity of the radiation falling on detector 12 and originating at the various sources 13 is a function of some variable condition at the sensors. FIG. 1 shows three sensors 10 symmetrically disposed around the radiation detector 12; however, the number of sensors which may be used depends upon the number of conditions it is desired to monitor and the number of energy channels available in the monitoring equipment used.

Figure 1C:
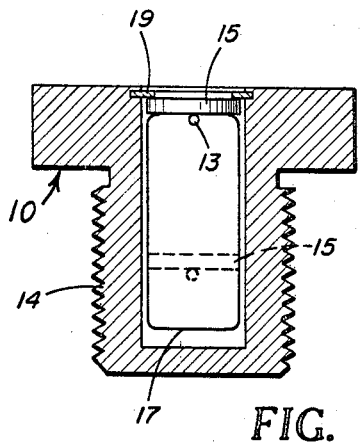
FIGS. 1A through 1E show various examples of different types of condition responsive sensors which can be used in the pressure vessel of FIG. 1.
Figure 1A:
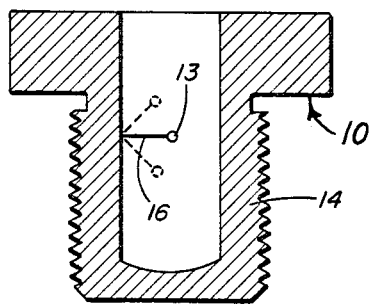

The temperature sensor shown in FIG. 1A includes a radioactive source 13 mounted on one end of a bi-metallic thermometer 16 which is attached to the water filled chamber within the structure 14. The dotted line representation of thermometer 16 which defines different positions of the radioactive source 13 illustrates how the bi-metallic thermometer would respond to a variation in temperature within the water filled chamber. In the example shown the cold position is above and the hot position below the horizontally extended bi-metallic thermometer 13'. This would mean of course that the intensity of radiation falling on the detector 12 would increase as the temperature of the water within the open chamber increases.

Figure 1D:
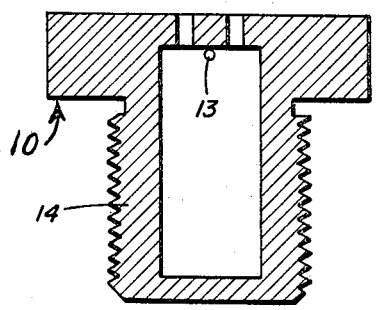
Figure 1B:
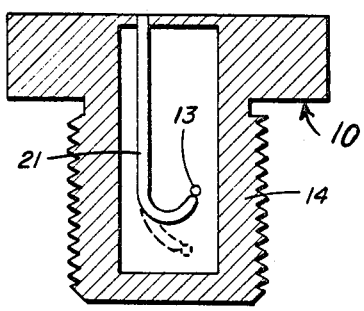

In FIG. 1B there is shown a radioactive source 13 mounted on the end of a Bourdon tube 21 extending within an enclosed air filled chamber. The dotted line representation of the Bourdon tube 21 is the high pressure position of the tube and the solid line representation is the low pressure position of the tube. The arrangement shown in FIG. 1B is similar to that shown in FIG. 1A in that the distance between the radiation source 13 and detector 12 is varied in accordance with the condition (pressure) to be measured.

FIG. 1C is another form of pressure sensor which can be used in the walls of the pressure vessel 11. In FIG. 1C an air filled bag 17 is inserted in the chamber and a piston member 15 is positioned at the open end of the bag as shown. A retaining ring 19 at the open end of the chamber prevents the bag 17 and piston 15, which carries a radioactive source 13, from being removed from the chamber. As the pressure against the piston 15 increases, the piston is moved to its high pressure position as shown by the dotted line representation of the piston. This movement decreases the distance between the radiation source 13 and the detector 12 thereby causing an increase in radiation intensity falling on the detector 12. This decrease in distance and corresponding increase in radiation intensity corresponds to an increase in pressure against the piston 15.

FIG. 1D illustrates a density sensor in which the source 13 is rigidly mounted at one end of the water-filled chamber. As the density between the source and the radiation detector increases the intensity of radiation falling on the detector decreases.

Figure 1E:
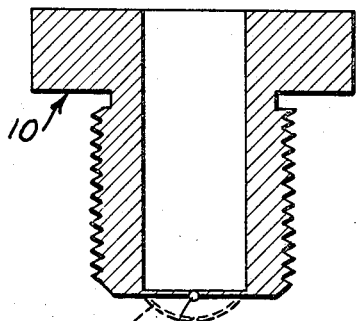

FIG. 1E illustrates another form of pressure sensor which can be used in the pressure vessel 11. In FIG. 1E the chamber is open and water filled and has a diaphragm 20 mounted at one end thereof. The diaphragm 20 carries a radioactive source 13 in the center thereof and the diaphragm is designed to be flexed outwardly of the chamber to its dotted line position as the water pressure within the chamber increases. Once again the distance between the radioactive source 13 and the radiation detector 12 is decreased as the pressure within the chamber is increased.

Obviously many other types of sensors could be employed with the detector and pressure vessel of FIG. 1 where it is desired to measure variables other than the ones described with references to FIGURES 1A through 1E.

FIG. 2 illustrates the output circuitry which may be connected to the radiation detector 12 in the pressure vessel 11 for processing the electrical signals which represent the variations of intensity of the radiation received from the respective sensors 10. The radiation source 13 associated with each of these sensors has a discrete energy band somewhere between 0 and 250 kev. In FIG. 2A, three energy bands, $E_1$, $E_2$ and $E_3$, are shown for the three sensors mounted in the pressure vessel 11.

The output of the detector 12 is a pulse, the response of which is proportional to all light quanta absorbed from the gamma quanta at the respective sensors 10. The characteristic pulse frequency is a property of the detector 12 and the output pulses contain all energies $E_1$, $E_2$ and $E_3$ for the example given.

A plurality of single channel analyzers, each having separate energy pass bands, are used to process the signals at the output of the detector 12 which lie in discrete energy bands. Three single channel analyzers 17 are connected to the output of the detector 12 and each of these analyzers passes signals in a discrete energy band corresponding to the energies $E_1$, $E_2$ and $E_3$, respectively. A counter 20 is connected to the output of each of these analyzers 17 and the count read on each of these three counters is directly proportional to the amplitude of the signals received from the respective outputs of the three channel analyzers 17. Thus, the count read on the individual counters 20 will vary in accordance with the variable condition to be sensed at each of the respective sensors 10 in the walls of the pressure vessel.

A multi-channel analyzer 18 may be switched into the output circuit in place of the single channel analyzers 17 if desired.

The distribution of gamma ray intensities for the various energies received at detector 12 is illustrated in FIG. 2A, and the energy distribution with which the present invention is concerned ranges from 0 to 250 kev.

In this energy range the separate channels $E_1$, $E_2$ and $E_3$ are located. Obviously, the present invention is not restricted to this range and the entire distribution of gamma ray intensities could be used to measure interesting phenomena other than the examples given above.

If desired, alpha sources can be used in the sensors to add sensitivity to the measurements made by the sensors due to the more rapid change of radiation intensity with distance and absorptive thickness between sensor and detector. A semiconductor radiation detector can be used to monitor the alpha sources. The invention may also be used with a data recording and/or telemetering system instead of a cable.

The alternative methods of operation include varying the sources of energies and even the various types of radiation, depending upon the distance from source to detector and/or radiation absorber mass, both of which change in a known way with some variable.

Other modifications may be made in the illustrative embodiments of the present invention without departing from the spirit and scope thereof. Therefore, it should be understood that the invention is limited only by the appended claims.

What is claimed is:
1. A system for measuring a plurality of variable conditions at a given location comprising:
   a single radiation detector,
   a vessel surrounding said radiation detector and having apertures therein,
   a plurality of sensors disposed within the apertures of said vessel for emitting radiation, the intensity of which varies as a function of the variable condition to be measured by the respective sensors,
   a radiation source disposed within each of said sensors and each of said sources having distinct energy levels,
   means connected to said radiation detector for continuously monitoring the changes in the variable condition at each of said individual sensors,
   said monitoring means including a plurality of single channel analyzers each of which is responsive to a distinct energy band of one of said sources and connectable in parallel to said radiation detector for processing electrical signals generated by said detector indicative of the discrete energy bands of each of said radiation sources, said monitoring means also including a multichannel analyzer connectable to said radiation detector for processing electrical signals generated by said detector indicative of the discrete energy bands of all of said radiation sources,
   means individually connected to said single channel analyzers for measuring the amplitude of the signals to which the respective single channel analyzer is responsive, and
   circuit switching means for selectively connecting said radiation detector to either said multichannel analyzer or said plurality of single channel analyzers.
2. A system for measuring a plurality of variable conditions at a given location comprising:
   a single radiation detector,
   a plurality of sensors adjacent said radiation detector for emitting radiation at separate and distinct energy levels, the intensity of which varies as a function of the variable condition to be measured at the sensor,
   a vessel surrounding said radiation detector and having apertures therein, said sensors being diposed around said detector and mounted in said apertures, and
   means connected to said radiation detector for continuously monitoring the changes in the variable condition at each of the individual sensors by processing electrical signals emitted from said radiation detector in discrete energy bands, said energy bands being inclusive of the energy levels respectively of the radiation emitted from said sensors.

3. The system of claim 2 wherein each of said sensors includes a radiation source, said sources having said separate and distinct energy levels and means included in said monitoring means for measuring the variations in the intensity of radiation emitted by the individual sources.

4. The system of claim 2 wherein at least one of said sensors includes means therein connected to said source of radiation for varying the distance between the source and said radiation detector as a function of pressure.

5. The system of claim 4 wherein at least one of said sensors includes means therein connected to said radiation source for varying the distance between said source and said radiation detector as a function of ambient temperature.

6. The system of claim 5 wherein at least one of said sensors therein is fixed with respect to said radiation detector whereby the intensity of the radiation received at the radiation detector is a function of the density of the medium occupying the space between said radiation source and said radiation detector.

7. The system of claim 3 wherein said monitoring means includes a plurality of single channel analyzers connected in parallel to the output of the radiation detector for processing electrical signals in discrete energy bands, said energy bands being inclusive of the energy levels respectively of the radiation sources of the sensors and means connected to the output of the channel analyzers for measuring the amplitude of the signals lying in the discrete energy bands.

8. The system of claim 7 which further includes a multichannel analyzer connected in parallel with said single channel analyzers and selectively connectable to said radiation detector.

References Cited

UNITED STATES PATENTS

| | | | |
|---|---|---|---|
| 2,874,303 | 2/1959 | Lane | 250—106 |
| 3,043,955 | 7/1962 | Friedland et al. | 250—83.3 |
| 3,108,188 | 10/1963 | Dewan et al. | 250—83.3 |
| 3,113,464 | 12/1963 | Shulman | 250—106 X |
| 3,151,246 | 9/1964 | Mardock | 250—106 |
| 3,158,028 | 11/1964 | Chope | 250—83.3 X |
| 3,234,388 | 2/1966 | Schultz et al. | 250—106 |
| 3,254,211 | 5/1966 | Black | 250—106 |

RALPH G. NILSON, *Primary Examiner.*

S. ELBAUM, *Assistant Examiner.*